Figure 1:
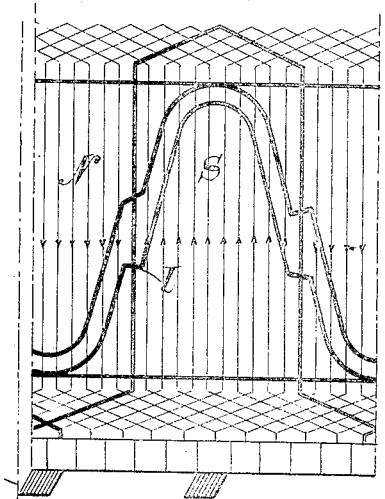

J. SCHÜRCH.
DYNAMO ELECTRIC MACHINE FOR THE PRODUCTION OF CONTINUOUS AND ALTERNATING CURRENTS.
APPLICATION FILED MAY 15, 1908.

966,246.

Patented Aug. 2, 1910.

5 SHEETS—SHEET 1.

Witnesses
R. N. Flint
C. E. Bruce

Inventor
Jakob Schürch
Attorney

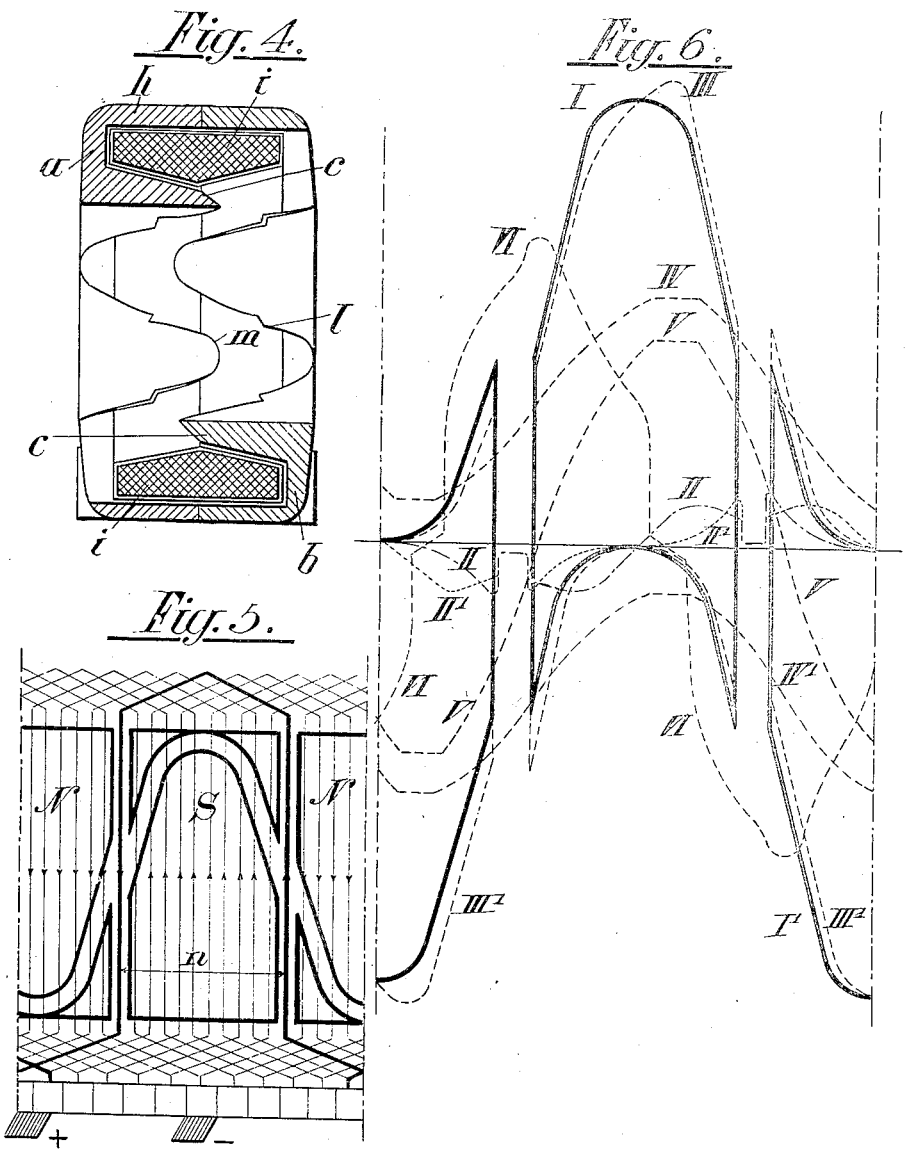

J. SCHÜRCH
DYNAMO ELECTRIC MACHINE FOR THE PRODUCTION OF CONTINUOUS AND ALTERNATING CURRENTS.
APPLICATION FILED MAY 15, 1908.
966,246.
Patented Aug. 2, 1910.
5 SHEETS—SHEET 3.
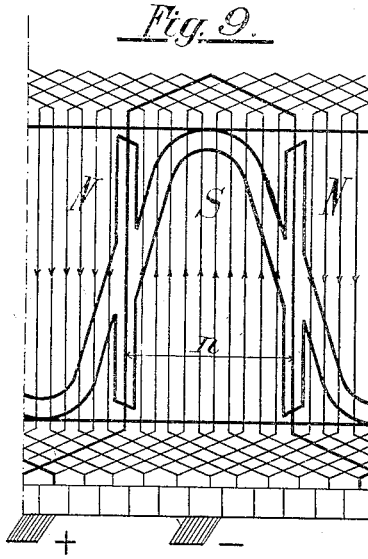
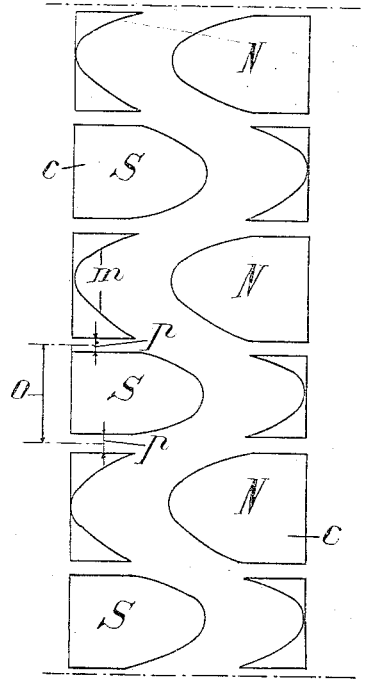
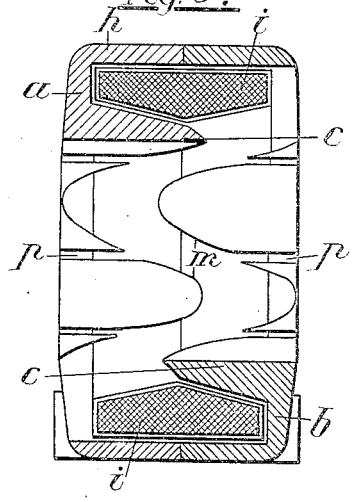

J. SCHÜRCH.
DYNAMO ELECTRIC MACHINE FOR THE PRODUCTION OF CONTINUOUS AND ALTERNATING CURRENTS.
APPLICATION FILED MAY 15, 1908.

966,246.

Patented Aug. 2, 1910.
5 SHEETS—SHEET 4.

J. SCHÜRCH.
DYNAMO ELECTRIC MACHINE FOR THE PRODUCTION OF CONTINUOUS AND ALTERNATING CURRENTS.
APPLICATION FILED MAY 15, 1908.
966,246.
Patented Aug. 2, 1910.
5 SHEETS—SHEET 5.
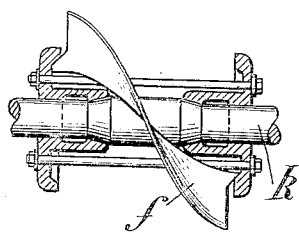
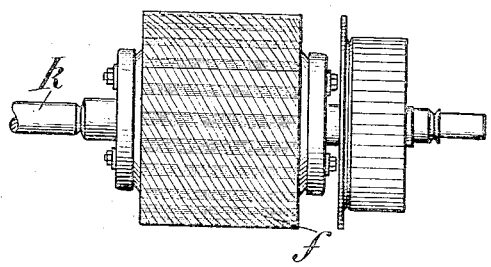
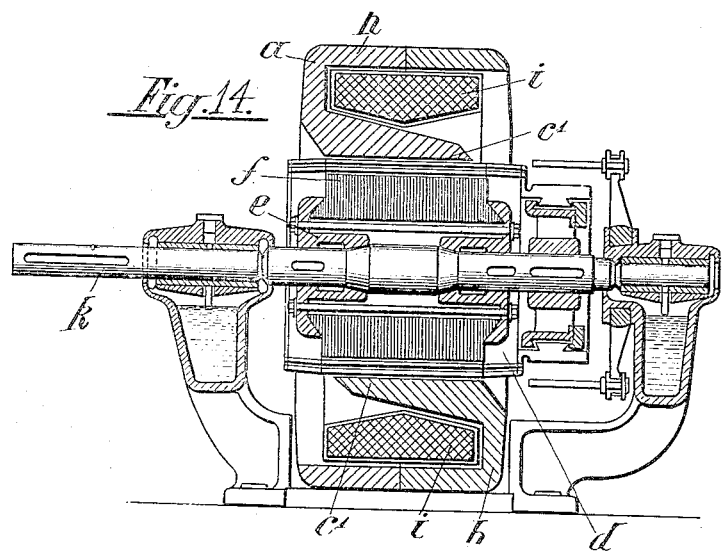

UNITED STATES PATENT OFFICE.

JAKOB SCHÜRCH, OF BRUCHSAL, GERMANY.

DYNAMO-ELECTRIC MACHINE FOR THE PRODUCTION OF CONTINUOUS AND ALTERNATING CURRENTS.

966,246. Specification of Letters Patent. Patented Aug. 2, 1910.

Application filed May 15, 1908. Serial No. 433,107.

*To all whom it may concern:*

Be it known that I, JAKOB SCHÜRCH, a citizen of the German Empire, residing at Bruchsal, in the Grand Dukedom of Baden, Empire of Germany, have invented certain new and useful Improvements in Dynamo-Electric Machines for the Production of Continuous and Alternating Currents; and I do hereby declare the following to be a full, clear, and exact description of the invention, such as will enable others skilled in the art to which it appertains to make and use the same.

The present invention relates to dynamo electric machines which serve for the production of continuous and alternating currents.

In spite of the essential advantages, namely the extraordinarily small percentage of energy used for their excitation, the known kinds of machines having a single coil magnetic field system whether homopolar or heteropolar, have with few exceptions been employed only for the production of alternating current and when used as continuous current machines are made almost entirely in the form of motors. The causes of this restricted use are various. Thus for example the obtaining of a sparkless current reversal presented difficulties in consequence of the great alteration of the strength of field within the neutral zone on different current loads, as the distance between the edges of the poles could only be diminished up to a certain degree, and the arrangement of reversing poles for compensating for armature reaction was impossible. Further the surface of the armature in known machines was badly utilized, and the same had to be constructed disproportionally large in order to attain a given output, so that it was naturally correspondingly heavy. The removal of these objections forms the main object of the present invention, the fundamental idea of which is the formation of the poles of the machines as pole teeth which fit into one another and render possible at will a close approximation of the same to correspond to particular constructive requirements whereby the interspace can nearly disappear. In these pole teeth then everywhere only edges and nowhere parallel surfaces are opposed whereby magnetic leakage as far as possible is counteracted. The utilization of the armature surface is consequently extremely effective so that as compared with known machines even of the most compact construction, in proportion to the weight, a higher efficiency is attained, together with a not inconsiderable saving in copper and iron. The boundary line of the pole teeth can in this case be a suitable regular curve, if desired, of the form of curve of the graph of the electromotive force.

According to the present invention a form is selected for the boundary line of the pole teeth, which permits of a continuous sparkless current reversal even on strongly varying loads.

In the hitherto known machines without reversing poles a current reversal without sparking could only be attained by the brushes being actually displaced or adjusted. In contrast to these machines the present invention differs by such a displacement of the brushes being quite superfluous, a continuous sparkless current reversal being attained without any such adjustment. This is attained by the creation of a current reversal zone of suitable width. For this purpose the course of the pole boundary lines regular in itself is interrupted in a suitable way corresponding to the action to be obtained. Thus for instance the curves at suitable places could have pronounced breaks, that is to say, the curves be broken in the form of steps. They would follow therefore the known regular form as far as these abrupt breaks and then after these breaks again resume their old direction. A spreading or expansion of the current reversal zone and thus sparkless running on varying load can also be attained by a subdivision of the pole surfaces. This subdivision can be conceived to be produced by the pole surfaces bounded by a continuous curve being cut at regular intervals parallel to the armature conductors and suitably spaced apart.

The invention is shown diagrammatically in the accompanying drawings, and also explained in several examples of forms of construction.

Figure 2:
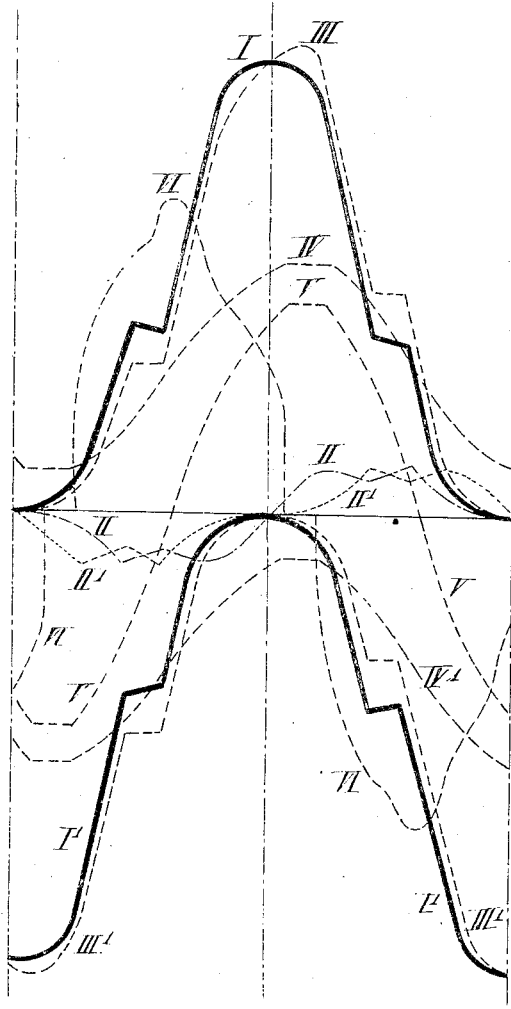
Figure 3:
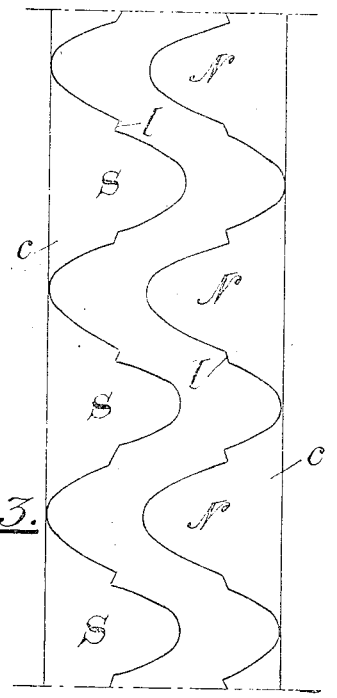
Figure 10:
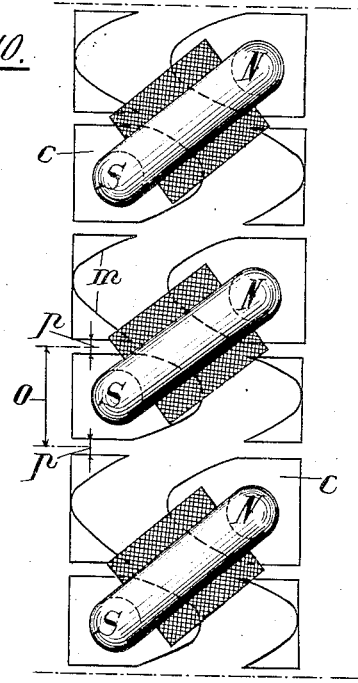
Figure 11:
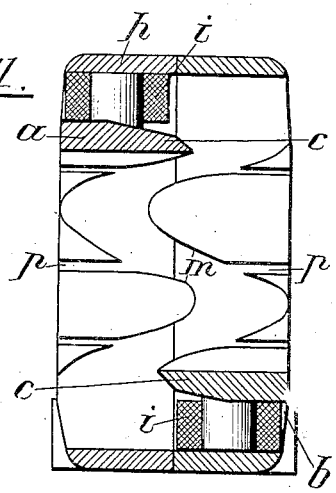

Figure 1, shows the armature winding diagram with the pole surfaces of the invention; Fig. 2 is a graphic representation of the method of working of the new machine; Fig. 3 shows a development of the pole surfaces of a 6-pole dynamo; and Fig. 4, an axial vertical section through the pole casing of a dynamo machine of the present invention; Figs. 5 to 9 inclusive are similar views of another form of construction; Figs. 10 and 11 show the development and section of forms of construction of multi-coil machines; Figs. 12 and 13 explain the construction of the armature employed by me, and Fig. 14 shows in section a machine provided with an armature having spirally formed core disks.

The present invention relates to dynamo electric machines in which the pole rings $a$ and $b$ are provided with pole pieces $c$ of novel form. The contours of the adjacent parts of the same can in this case be formed in any curve, for instance for pole pieces which enter to a short distance only between each other (Figs. 3, 4, 7 and 8) a sinus like boundary may be employed, while for pole pieces engaging deeper into one another (Figs. 1, 5 and 9) a suitable triangular form of pole piece with strongly rounded points is to be preferred in order to secure a uniform distance apart of the edge or periphery of the pole pieces. The pole pieces $c$, preferably receive such a form that they diminish in thickness toward the outside that is to say run more or less to an edge as shown in Figs. 4, 8 and 11, so that these edges are constantly opposed to each other in order to diminish magnetic leakage.

In machines in which the pole teeth $c$, as represented in Figs. 1, 5, 9 and 14, extend so deeply in between one another as seems preferable from considerations of leakage, a decrease in size or simplification of the machine, with a corresponding saving in material and weight, is obtained, and in such machines it is necessary in order to avoid certain eddy current losses to subdivide the whole armature $d$. In my machine in place of the armature core disks being vertical to the armature axis $k$—which would necessitate a field of unequal density—plates standing obliquely to the armature axis $k$ or with a helical form (Figs. 12 and 13) are chosen.

By forming the armature of separate helical sheets as shown in Figs. 12 to 14 an excellent ventilation is furthermore obtained, so that this armature can, with an equal increase of temperature, be loaded considerably higher than in armatures in which the feature above set forth is absent. This is due to the fact that conical interspaces are formed between the separate sheets the greatest width of which spaces is proportional to the height and thickness of the armature core disks. The armature disks therefore act as a ventilator whereby each separate disk comes in contact with the air and thus an excellent cooling of the armature results. In order now to obtain a current reversal zone as wide as possible, the boundary line of the pole piece $c$ according to this invention is given the form shown in Figs. 1 to 11.

In general the boundary lines or periphery $m$ of the pole pieces $c$ run in regular curves. At a suitable point, however, in the form of construction shown in Figs. 1 to 4, they suddenly turn laterally for a short distance, after which they again resume their former direction and form, or, as otherwise stated successive portions of the periphery of the pole pieces are offset relatively to one another in the direction of rotation of the armature. In this manner are produced steps or breaks $l$ the boundary lines of which can be of any form and position.

As regards the method of working of the new pole teeth reference is made to Fig. 2, in which the curves I, I$^1$, represent the boundary lines of the teeth and show at the same time the magnetic field of a pole when the armature is without current. The curves II, II$^1$, represent the cross field produced by the armature winding when the excitation is switched off. By the addition of the curves I and II or I$^1$ and II$^1$ the curves III and III$^1$ are obtained, which represent the field actually present when the machine is under load. From these curves, somewhat distorted by the reaction of the armature, can be ascertained the change in the number of lines of force inclosed by a coil due to the change in the angular position of the coil. This change is separately shown for each pole by the curves IV and IV$^1$, and it must be particularly pointed out that the apices of these curves, in consequence of the flattening of the curves III and III$^1$, are also flattened. By the addition of the curves IV and IV$^1$ the induction curve V is obtained which also has flattened apices so that the derived curve VI of the electro-motive force in an armature coil due to change of angular position is also deflected laterally on the passage through the zero position. In this way an expansion of the current reversal zone is obtained. It is however advantageous that this deviating line should not run quite horizontally. In order to interrupt the electro-motive force due to the self-induction of the coil short circuited by the brushes, the shape and position of the steps $l$ are preferably arranged in such a way that in this coil on passing the reversal zone an electromotive force of equal strength but of opposite direction is induced and thus a perfectly sparkless reversal of current is obtained.

In the forms of construction shown in Figs. 5 to 11 the pole pieces $c$ are subdivided and have a groove $p$ between them. So long as the short-circuited coil, the width of which $n$ (Fig. 9) corresponds to the interval $o$ (Fig. 7) of the subdivisions, moves in the interspace $p$, no electromotive force (apart from that due to self-induction) is induced in the same, as neither an addition to or diminution of the number of lines of force takes place. The mode of action is exactly seen from the diagram (Fig. 6) in which the significance of the various curves can be obtained from the explanations of Fig. 2.

The form shown in Figs. 5 to 11, as compared with that in Figs. 1 to 4, has the advantage that the total number of lines of force is diminished corresponding to the intervals $p$, while the action is in no way less than in the first described arrangement. The cross section of the magnetic circuit can therefore be diminished in the form shown in Figs. 5 to 11 proportionally to the saving in lines of force, so that the machine is lighter. Furthermore the action of the cross field of the armature will be lessened in a known manner by these savings.

In order to compensate for the electromotive force due to the self induction of the short-circuited coil, the grooves in the pole pieces in the form shown in Fig. 9 terminate before reaching the bases of the pole pieces whereby an approximately trapezoidal magnetic bridge is provided in each groove, dimensions of which exactly suffice to interrupt the electro-motive force due to self-induction. The boundary lines of this triangular or trapezoidal bridge will be determined empirically in practice and accordingly can also receive any form of curve instead of the straight line.

Figs. 10 and 11 finally explain the application of the invention to multi-coil machines.

I declare that what I claim is:—

1. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex, the arrangement of said pole pieces being such that each extends toward the space included between the edges of two other pole pieces of opposite polarity, and two successive portions of the periphery of each of said pole pieces being offset relatively to one another and in a direction corresponding with the direction of rotation of said armature.

2. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, and two successive portions of the periphery of each of said pole pieces being offset relatively to one another and in a direction corresponding with the direction of rotation of said armature.

3. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like poles being connected together and to the bases of the poles of opposite polarity by means of a single magnetic connecting member, and two successive portions of the periphery of each of said pole pieces being offset relatively to one another and in a direction corresponding with the direction of rotation of said armature.

4. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like poles being connected together and to the bases of the poles of opposite polarity by means of a single magnetic connecting member, and two successive portions of the periphery of each of said pole pieces being offset relatively to one another and in a direction corresponding with the direction of rotation of said armature; and a single coil for energizing said field magnet.

5. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like poles being connected together and to the bases of the poles of opposite polarity by means of a single magnetic connecting member, and two successive portions of the periphery of each of said pole pieces being offset relatively to one another and in a direction corresponding with the direction of rotation of said armature, and each of said pole pieces being provided with a groove extending parallel with the axis of said armature and terminating between successive relatively offset portions of the periphery of said pole pieces whereby gaps are provided in said pole pieces.

6. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like pole pieces being connected together and to the bases of the poles of opposite polarity by means of a single magnetic connecting member, and two successive portions of the periphery of each of said pole pieces being offset relatively to one another and in a direction corresponding with the direction of rotation of said armature, and each of said pole pieces being provided with a groove extending parallel with the axis of said armature and terminating between successive relatively offset portions of the periphery of said pole piece whereby gaps are provided in said pole pieces; and a single coil for energizing said field magnet.

7. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like poles being connected together and to the bases of the poles of opposite polarity by means of a single magnetic connecting member, and two successive portions of the periphery of each of said pole pieces being offset relatively to one another and in a direction corresponding with the direction of rotation of said armature, and each of said pole pieces being provided with a groove extending parallel with the axis of said armature and terminating at one end between successive relatively offset portions of the periphery of said pole pieces and terminating at the other end short of the bases of said pole pieces whereby gaps are provided in said pole pieces.

8. In a dynamo-electric machine, an armature, a field magnet comprising a series of pole pieces of alternate polarity and each pole piece having a base of considerable length in a direction corresponding with the direction of rotation of said armature and the peripheral edges of which pole pieces are inclined and meet at an apex which apices extend past one another so that each pole piece of given polarity will lie in between two other pole pieces of opposite polarity, all the bases of like poles being connected together and to the bases of the poles of opposite polarity by means of a single magnetic connecting member, and two successive portions of the periphery of each of said pole pieces being offset relatively to one another and in a direction corresponding with the direction of rotation of said armature, and each of said pole pieces being provided with a groove extending parallel with the axis of said armature and terminating at one end between successive relatively offset portions of the periphery of said pole pieces and terminating at the other end short of the bases of said pole pieces whereby gaps are provided in said pole pieces; and a single coil for energizing said field magnet.

9. In a dynamo-electric machine, an armature provided with a core made up of a plurality of plates bent into helical form, a field magnet surrounding said armature and provided with a plurality of poles of alternate polarity embracing said armature and disposed in alternation, so that a pole of given polarity will lie in between two other poles of opposite polarity, said pole pieces being widest at their base and tapering to a narrower free end.

In testimony whereof I affix my signature, in presence of two witnesses.

JAKOB SCHÜRCH.

Witnesses:
JEAN GULDEN,
HERM. HAPPE.